(12) United States Patent
Bodnar

(10) Patent No.: US 8,671,427 B1
(45) Date of Patent: Mar. 11, 2014

(54) METHOD AND APPARATUS TO ENABLE SENDING PERSONAL DATA VIA A NETWORK

(75) Inventor: Eric O. Bodnar, Santa Cruz, CA (US)

(73) Assignee: Verisign, Inc., Reston, VA (US)

( * ) Notice: Subject to any disclaimer, the term of this patent is extended or adjusted under 35 U.S.C. 154(b) by 0 days.

(21) Appl. No.: 13/267,807

(22) Filed: Oct. 6, 2011

Related U.S. Application Data

(63) Continuation of application No. 11/281,145, filed on Nov. 16, 2005, now abandoned.

(60) Provisional application No. 60/629,191, filed on Nov. 17, 2004.

(51) Int. Cl.
*H04N 5/445* (2011.01)

(52) U.S. Cl.
USPC .......... 725/44; 725/39; 725/87; 725/40; 725/47

(58) Field of Classification Search
None
See application file for complete search history.

(56) References Cited

U.S. PATENT DOCUMENTS

| | | | |
|---|---|---|---|
| 5,694,549 A | 12/1997 | Carlin et al. | |
| 6,678,740 B1 | 1/2004 | Rakib et al. | |
| 6,774,926 B1 * | 8/2004 | Ellis et al. | 348/14.01 |
| 6,973,667 B2 | 12/2005 | Fritsch | |
| 7,114,174 B1 * | 9/2006 | Brooks et al. | 725/105 |
| 7,143,432 B1 * | 11/2006 | Brooks et al. | 725/105 |
| 2002/0031120 A1 | 3/2002 | Rakib | |
| 2002/0104099 A1 | 8/2002 | Novak | |
| 2002/0174430 A1 * | 11/2002 | Ellis et al. | 725/46 |
| 2005/0076384 A1 | 4/2005 | Upendran et al. | |
| 2005/0081154 A1 | 4/2005 | Vogel | |
| 2005/0262542 A1 * | 11/2005 | DeWeese et al. | 725/106 |
| 2007/0220580 A1 | 9/2007 | Putterman et al. | |

OTHER PUBLICATIONS

Video on Demand, <http://www.twcstny.com/products/cabletv/vodfaq.php, accessed Nov. 10, 2005>, 3 pages.
Ultra Wideband Over Cable Technologies: Enhancing Cable Television Bandwidth Capacity Without Modification to Existing Infrastructure, <http://www.pulselink.net/Pulse-LINK-UWBOC-whitepaper.pdf>, 5 pages.
DivX® Video-on-Demand FAQs, <http://web.archive.org/web/20050317085046/http://www.divxnetworks.com/solutions/vod/faq.php>, accessed Dec. 16, 2008, 4 pages.

* cited by examiner

*Primary Examiner* — Chi Chen
(74) *Attorney, Agent, or Firm* — Blakely, Sokoloff, Taylor & Zafman LLP; Judith A. Szepesi

(57) ABSTRACT

A method and apparatus for using a dynamic streaming server interface to enable the display of personal data in a cable box environment is disclosed. The system includes an interface to forward data to the server, an insertion tool to insert the display into the channel guide, and controls to enable the user to view the personal data using the cable box and interface.

13 Claims, 14 Drawing Sheets

METHOD AND APPARATUS TO ENABLE SENDING PERSONAL DATA VIA A NETWORK

FIELD OF THE INVENTION

This application claims priority to U.S. patent Ser. No. 11/281,145, filed Nov. 16, 2005, which claimed priority to U.S. Provisional Patent Application Ser. No. 60/629,191, filed Nov. 17, 2004. Both disclosures are incorporated in their entirety by reference.

FIELD OF THE INVENTION

The present invention relates to using a network to send personal data, and more particularly to inserting into a cable box display a listing for the personal data.

BACKGROUND

Video-on-Demand (VOD) is becoming more popular. After a decade of promising that Video on Demand (VOD) service was just around the corner, the cable television industry has finally started delivering on its promise. Over the past year, digital cable and VOD services have become available in dozens of cities and metropolitan areas throughout the United States and Canada, and VOD subscribers are now able to "time shift" their favorite movies, programs, and sporting events.

VOD services enable a user to effectively "order" movies, sporting events, and other similar broadcast/cable programming at any time. Advanced VOD services, generally referred to as interactive video-on-demand, enable the user to have controls to manipulate the video. The user, for example, may be able to fast forward, rewind, replay, pause, and otherwise adjust the experience as with an improved digital recorder device.

In general, these VOD services are available to all subscribers of a given digital cable service. The VOD services usually make a select number of movies available at any given time. These movies can be ordered at any time and watched immediately without the time-slot restrictions of traditional pay-per-view channel movies. Additional television programming can also be available using VOD.

SUMMARY OF THE INVENTION

A method and apparatus for using a streaming server to enable the display of personal data is disclosed. The system includes an interface to forward data to the server, an insertion tool to insert the display into the channel guide, and controls to enable the user to view the personal data using the cable box and interface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus describe using an interface to enable the display of personal data via a user's cable box. The personal data contemplated includes, but is not limited to, video, static images (for example photographs), a constructed slideshow, streaming audio, streaming video, live recording of data. For example, the system is contemplated to enable a first user to set up a web camera or similar interface, and continuously upload data to the server, which can then continuously stream data to a user who is tuned in to the proper frequency. In one embodiment, security is provided, so that only the intended recipient is able to access the data. This is useful, for example, to enable individuals who do not own a computer, or are not computer-savvy to view photographs or videos recorded by someone.

For example, a first user (call her Alice) records some short video clips and takes a number of pictures on her camera phone. A second user (call him Bob), who does not use computers, can view these pictures and video clips on his television, using the video-on-demand interface. This does not require the purchase, installation, or maintenance of additional hardware by Bob, and an intuitive interface, described below, is provided to simplify the experience.

Figure 1A:
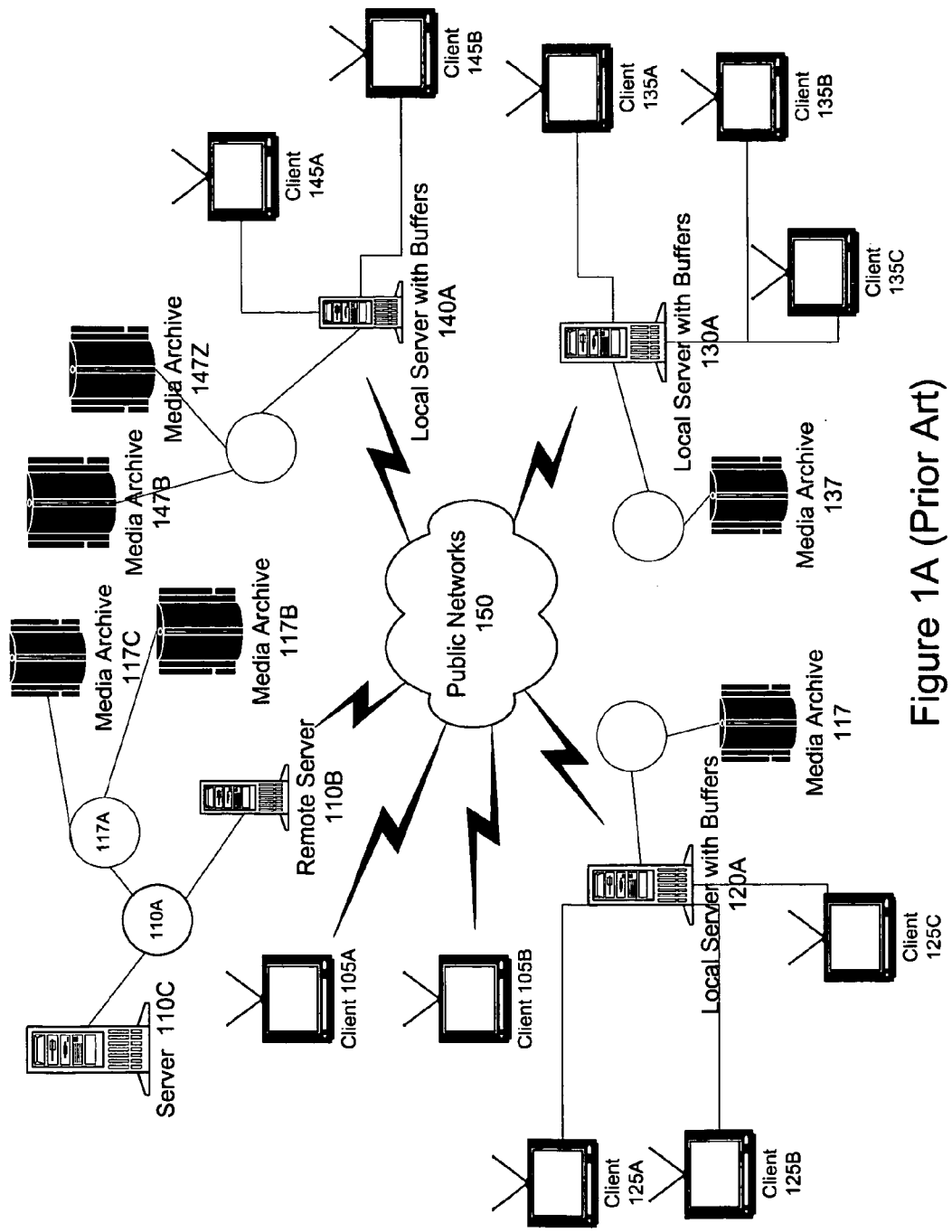
FIG. 1A is a network diagram of a prior art video-on-demand (VOD) system.

FIG. 1A is a network diagram of a video-on-demand (VOD) system. In general, the VOD system is designed to have numerous clients coupled to it. Each client has access to media via the VOD system. In the prior art, each user had access to the same set of video/media data. For example, the VOD system may make a recently released movie available via VOD. Each of the clients, on each local server would have access to the same movie. However, unlike pay-per-view, each user could start viewing the movie at any time, and potentially be able to have interactive controls available. In one embodiment, the VOD system may use local servers with local buffers and local media archives (shown for example as server 120A and media archive 117). This ensures that there are no delays, and reduces the load on the servers. In another embodiment, the system may use a central remote server 110B, and force access through the central server for all users. In one embodiment, each local server 120A has a buffer. The buffer stores a few minutes of the upcoming (or in case interactive controls enable reversing backward flowing) data currently being streamed to a client. This ensures that the user's experience is not impacted by the occasional reduction in bandwidth that occurs. The buffer may, in one embodiment, store a movie in its entirety. In the cases described below, the buffer may store all of the currently available media data for the individual user.

The media archives, in one embodiment associated with each of the servers, stores all of the multimedia data available to all users. In one embodiment, local media archives store locally available data. Thus, in one embodiment, multiple copies of the same media content may exist on different media archives. In another embodiment, a centralized archive stores most of the data. In one embodiment, local media archives store enough of each media object to enable immediate start of viewing, without waiting for the download to initiate. In one embodiment, the VOD has a limited amount of bandwidth. Therefore, only a limited number of clients/users may be connected at any one time to the local/central server.

Figure 1B:
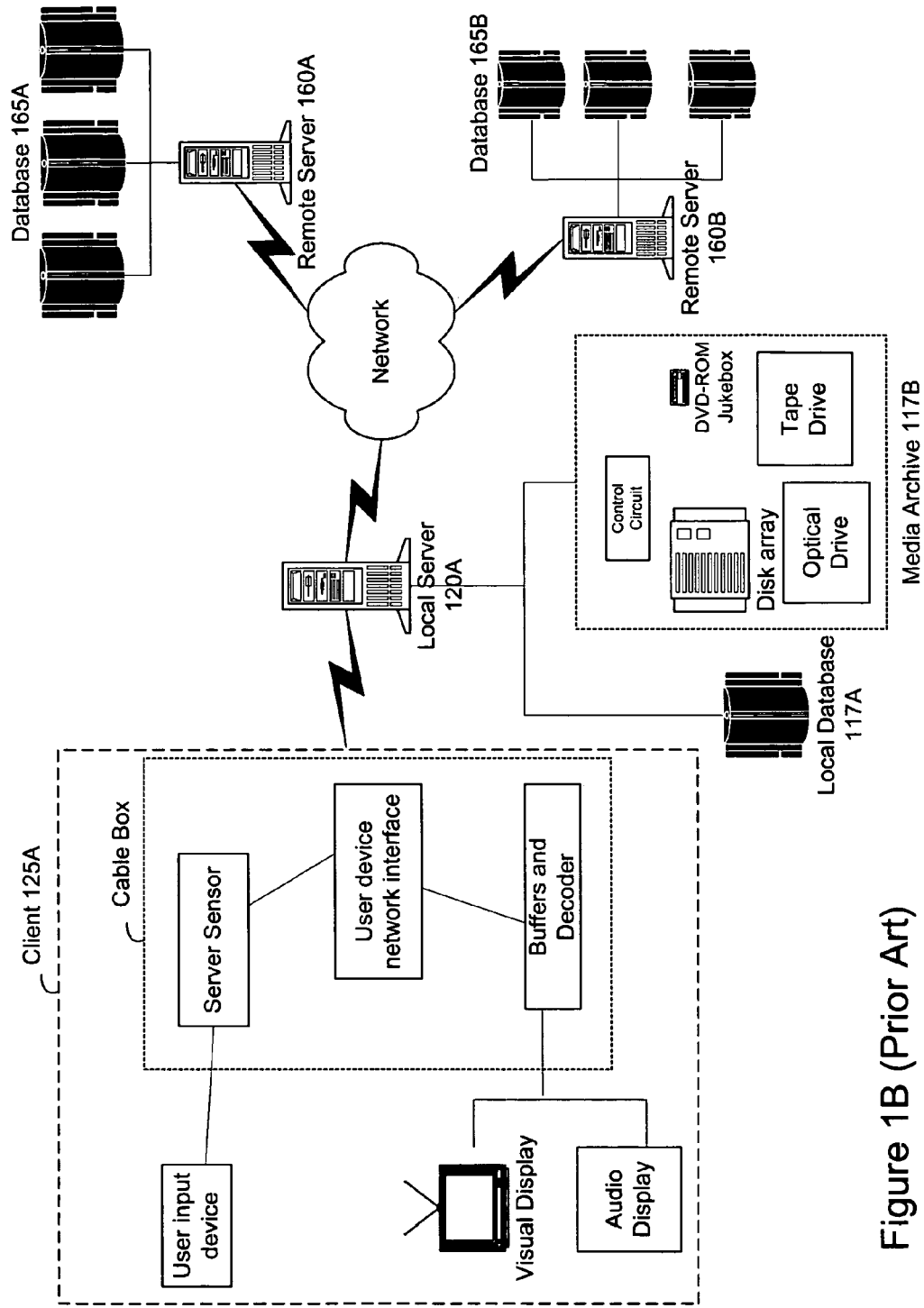
FIG. 1B is an exemplary diagram illustrating in more detail the client and local server in a system.

FIG. 1B is an exemplary diagram illustrating in more detail the client and local server in a VOD system. As can be seen, the client 125A includes a cable box, a user input device, and displays (visual and audio). Of course, additional elements may be included. The user input device, in general, is a remote control or similar tool for interacting with the cable box. The server sensor translates the data from the user input device into commands understood by the VOD server(s). In one embodiment, the commands include identification of the selected media object, and the operation on that media object. In one embodiment, each media object (which may include a slideshow, individual images, movies, audio tracks or any other content) has a unique identifier. Thus, the server sensor's output includes: the client identification (identifying the client who should receive this data), the unique identifier of the selected media object, and the command requested by the user. Commands may include, for example: start, stop, pause, fast forward, and rewind. The server sensor passes this data on to the network interface.

The network interface translates this data into a command, to be sent to the server to which the cable box is connected. This server may be a local server, or a remote server. In one embodiment, there is a local server. In one embodiment, the data is sent in http post format. Other formats supported by the server may be used.

In one embodiment, the local server determines whether the requested data is available on the local database 117A. The local database 117A tracks the contents of the available local media archive 117B. If the data is not available on the local media archive 117B, the local server 120A passes the request on to a remote server 160A/B. The remote server 160A/B then starts sending the data to the local server. In one embodiment, once a download is started, the remote server 160A sends the entire file. In one embodiment, the local server 120A stores the data in the local media archive 117B.

In one embodiment, the local server 120A stores the data temporarily in the local buffer, before passing it to the user's network interface.

In one embodiment, the buffer is used to compensate for the difference in streaming speed. In one embodiment, an extremely high bandwidth connection is used to couple local server 120A to remote server 160A. The bandwidth between local server 120A and the user's cable box may be a lower bandwidth connection. The buffer in local server 120A also attempts to ensure that fluctuations in bandwidth do not impact the visual display. In one embodiment, the client's cable box also includes buffers. The cable box also includes decoders, as is known in the art.

In one embodiment, the personal data targeted to a user is stored in a local server 120A, if possible. In one embodiment, all data is stored in a centralized personal data store, and copies are sent out to local servers 120A as requested.

Figure 1C:
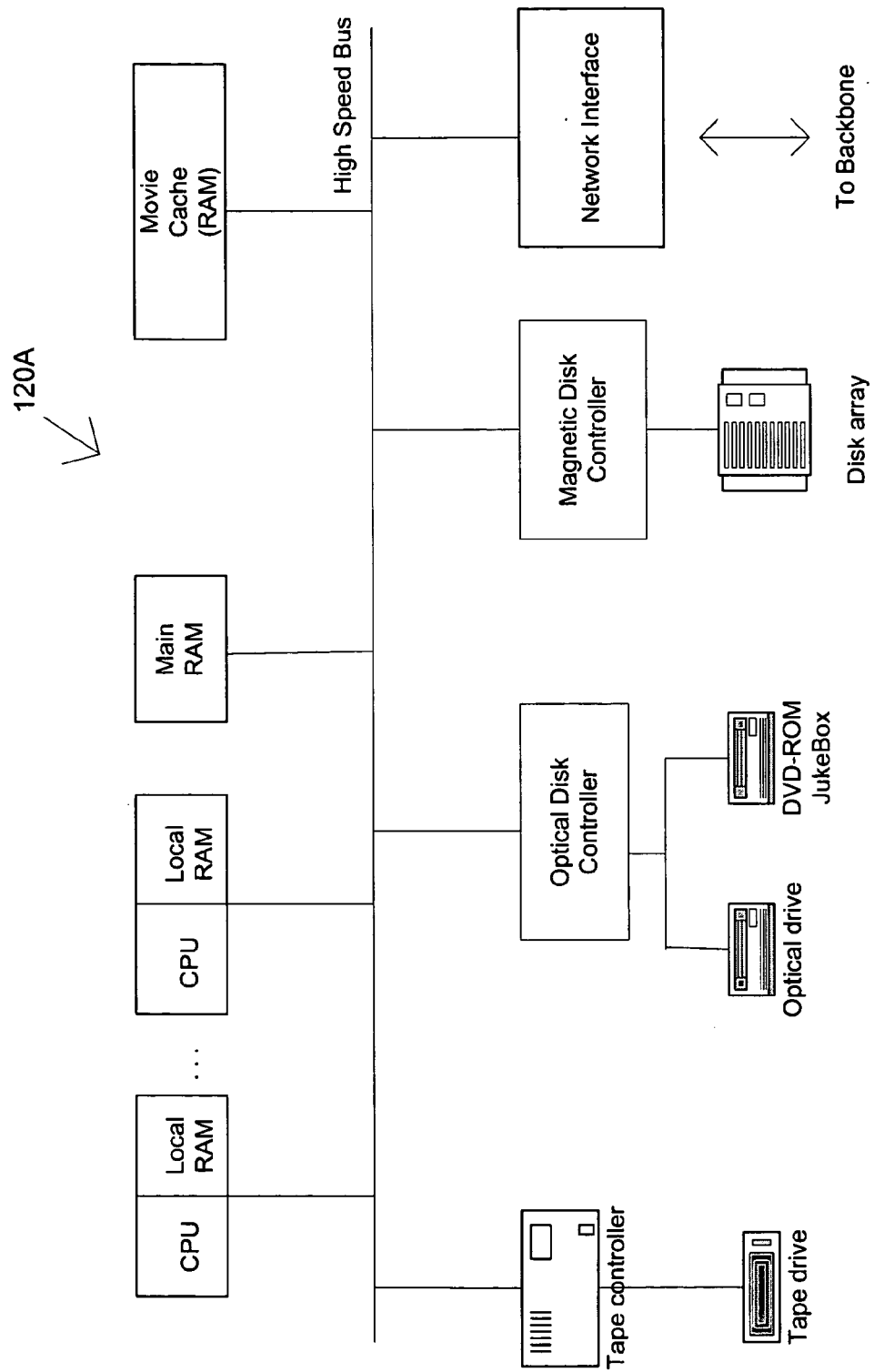
FIG. 1C is an exemplary block diagram illustrating the interconnections within a server that may be used with the system.

FIG. 1C is an exemplary block diagram illustrating the interconnections within a server that may be used with the VOD system. As can be seen, the system includes multiple processors (CPUs) with associated local RAM. In one embodiment, a movie cache provides temporary storage for currently streaming data from the optical, tape, jukebox, or disk array, since each of those accesses requires some time. In one embodiment, the local server may have multiple CPUs. In another embodiment, this may represent multiple servers, each of which is connected through a high speed bus to the data sources.

Figure 2A:
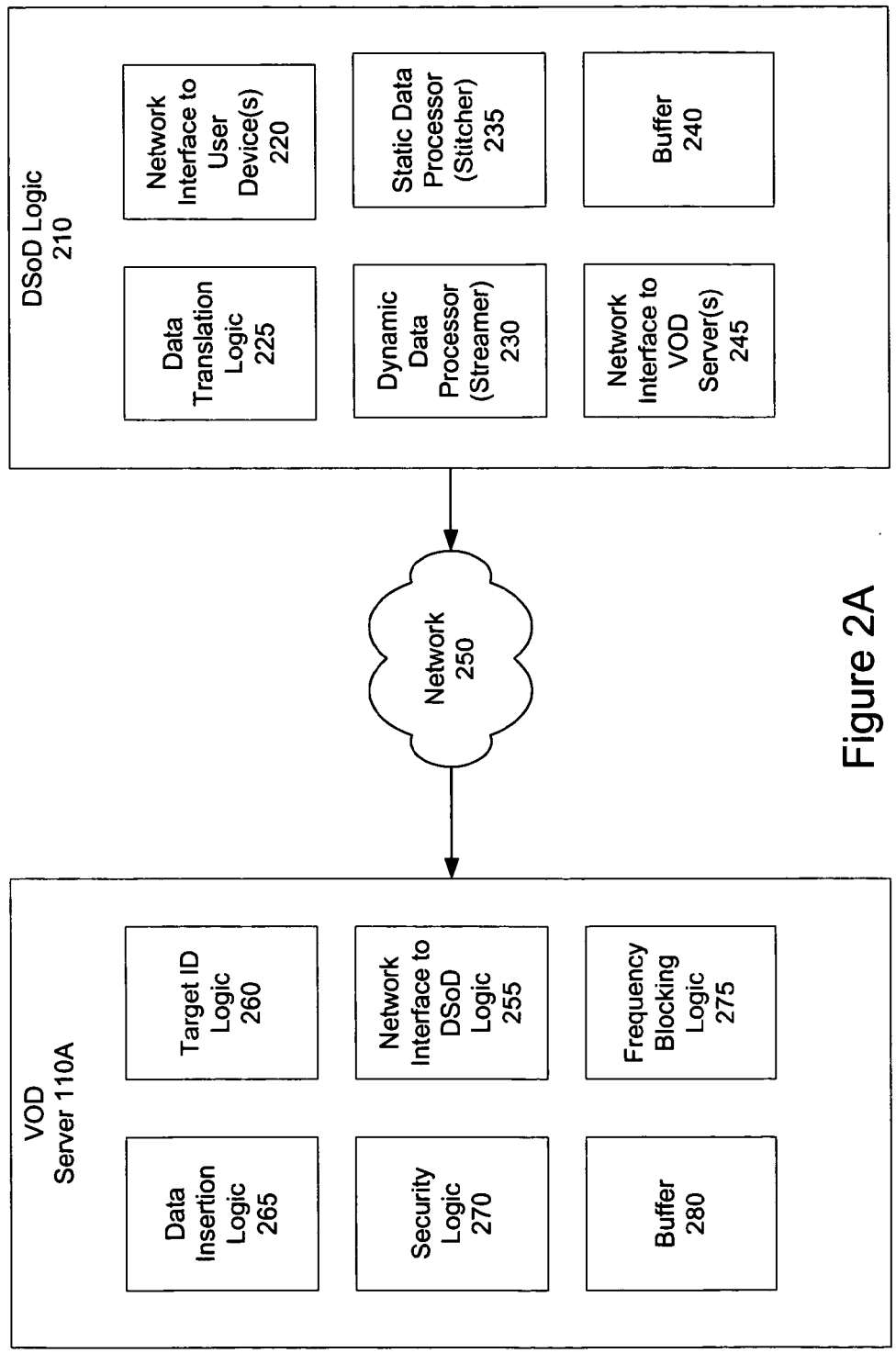
FIG. 2A is a network diagram of one embodiment of the system including the Dynamic Stream on Demand (DSoD) logic of the present invention.

FIG. 2A is a network diagram of one embodiment of the VOD system including the Dynamic Stream on Demand (DSoD) logic of the present invention.

Figure 2B:
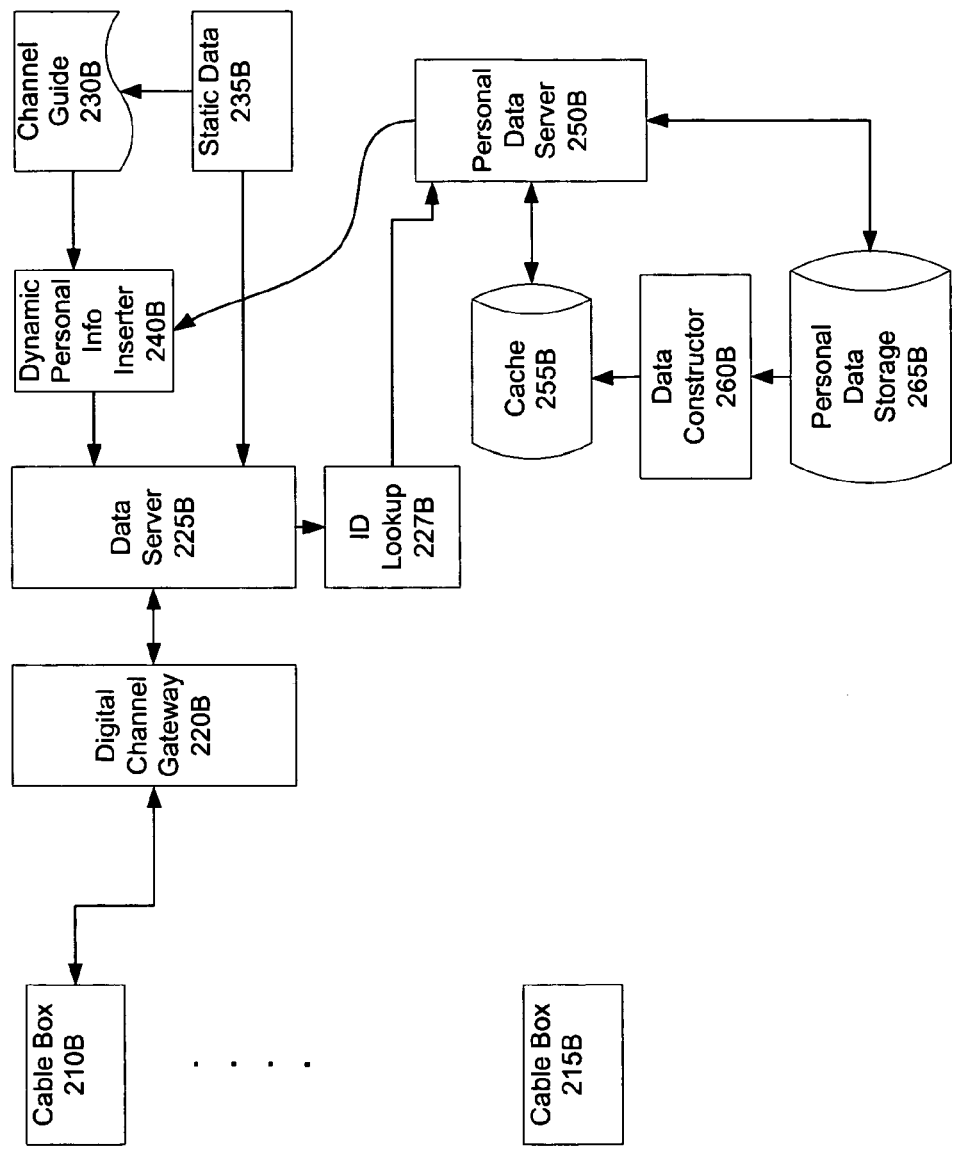
FIG. 2B is a block diagram showing one embodiment of the system from the user's cable box to the personal data storage.

FIG. 2B is a block diagram showing one embodiment of the system from the user's cable box to the personal data storage. Each user/subscriber has a cable box 210B, 215B. A digital channel gateway 220B locally serves a set of cable boxes 210B, 215B. The digital channel gateway 220B serves a channel guide 230B as well as standard cable content and the personal content of the present invention.

The digital channel gateway 220B receives data from the cable boxes 210B-215B. A channel guide 230B, in one embodiment comprising static content, is used to display the available shows, movies, specials, pay-per-view movies, etc. In one embodiment, the dynamic personal info inserter 240B adds relevant personal information to the static data represented by the channel guide 230B. The data server 225B serves static data content 235B, such as movies, pay-per-view movies, and other shows that are not broadcast television, but rather locally cached by static data 235B. In one embodiment, certain static data 235B may be retrieved from an external data source (not shown). In one embodiment, the data is buffered before the data server 225B passes it to the requesting user.

The channel guide 230B, in one embodiment, includes a location where the dynamic/personal information link may be inserted. When a cable box 210B first requests the channel guide 230B, an ID look-up 227B identifies the unique identifier associated with the subscriber/cable box. In one embodiment, the same identifier is used for personal data. In another embodiment, the system performs a look-up for the personal data subscriber identifier used to track personal data subscriptions.

The personal data subscriber ID is passed on to the personal data server 250B. The personal data server 250B looks up whether the ID is associated with any personal data. In one embodiment, this is done as a database look-up. In another embodiment, an alternative look-up mechanism may be used. If there is data associated with the subscriber identifier, the personal data server 250B returns information about that data to the dynamic personal information inserter 240B, which inserts the link it into the appropriate location in the channel guide 230B. The digital channel gateway 220B then returns the complete channel guide 230B, including the link to the personal data, to the user's cable box 210B for display. While the term "link" is used, this does not indicate that the included information is a URL, pointer, or actual link. Rather, the information simply uniquely identifies the available personal data. In one embodiment, the link may include one or more of the following: a title, description, identification of originating user, length, number of component elements, description of content (i.e. slideshow, video, etc.)

Figure 8:
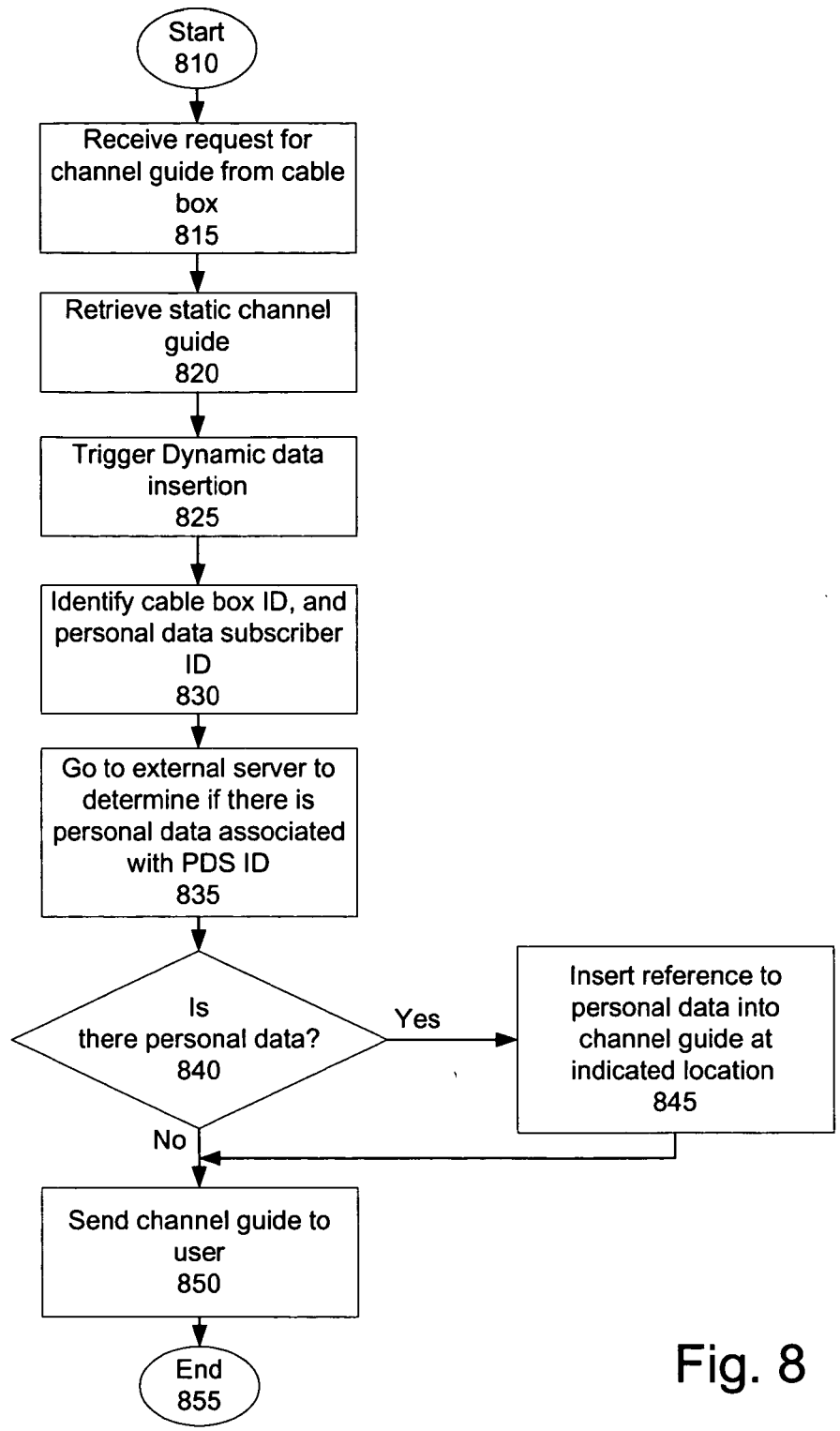
FIG. 8 is a flowchart of one embodiment of generating the dynamic channel guide including the user's data.
Figure 9:
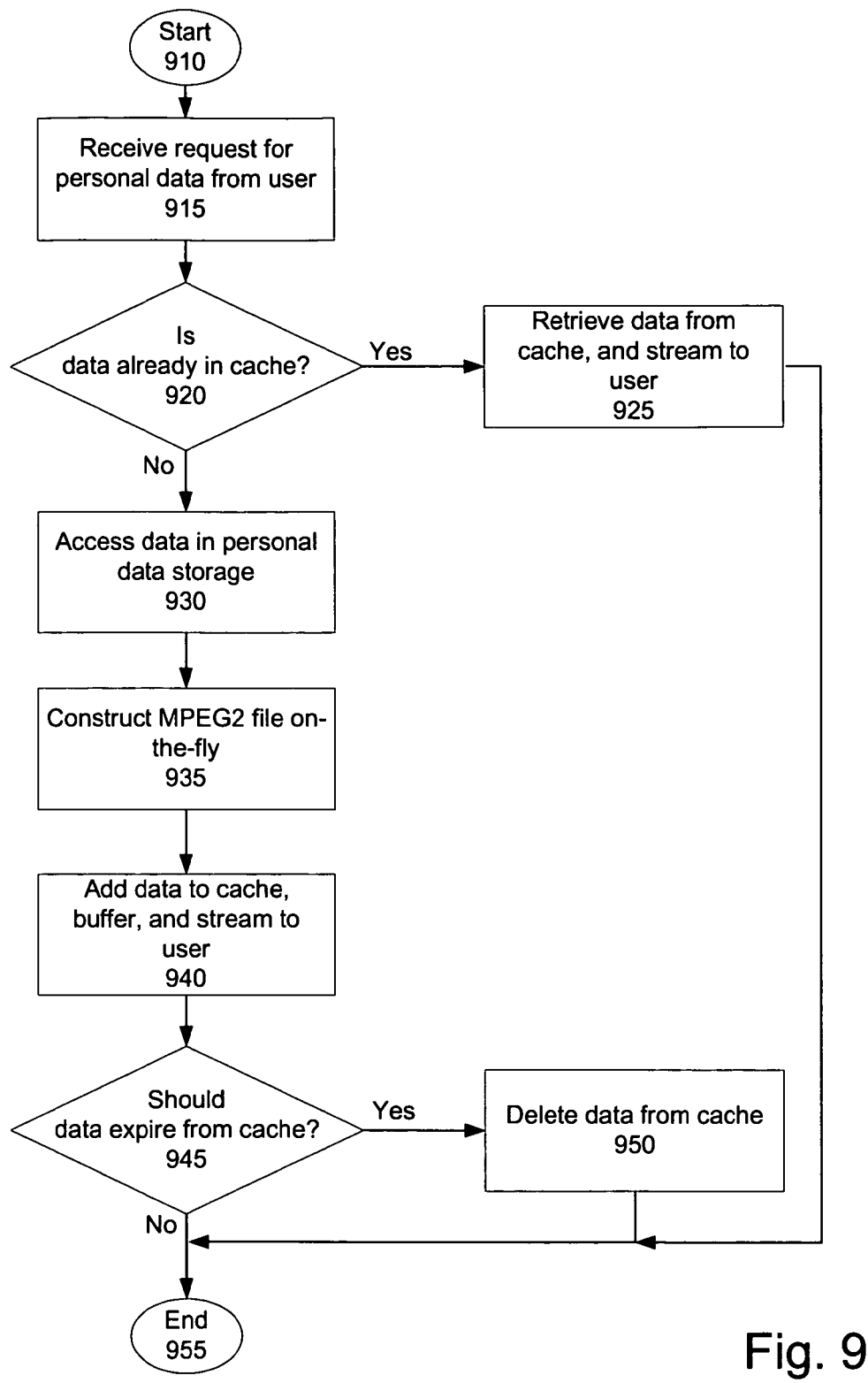
FIG. 9 is a flowchart of one embodiment of serving personal content to a user.

In one embodiment, slideshows and similar data are not stored in "transcoded" format. That is, in general personal data is uploaded in a first format, such as individual images, MP3 audio, or similar format. In general, the televisions connected to the cable boxes cannot display such items. Therefore, when data is requested, the data constructor 260B, on the fly, constructs from the original data the MPEG-2 format data that can be displayed by the televisions. In one embodiment, such data is then temporarily stored in cache 255B. This trades processing power for storage space. Alternatively, the system may permanently store transcoded data. Alternatively, the system may process data as it is received, rather than as it is requested, and only store the transcoded data. FIGS. 8 and 9 below describe this process in more detail.

Figure 3:
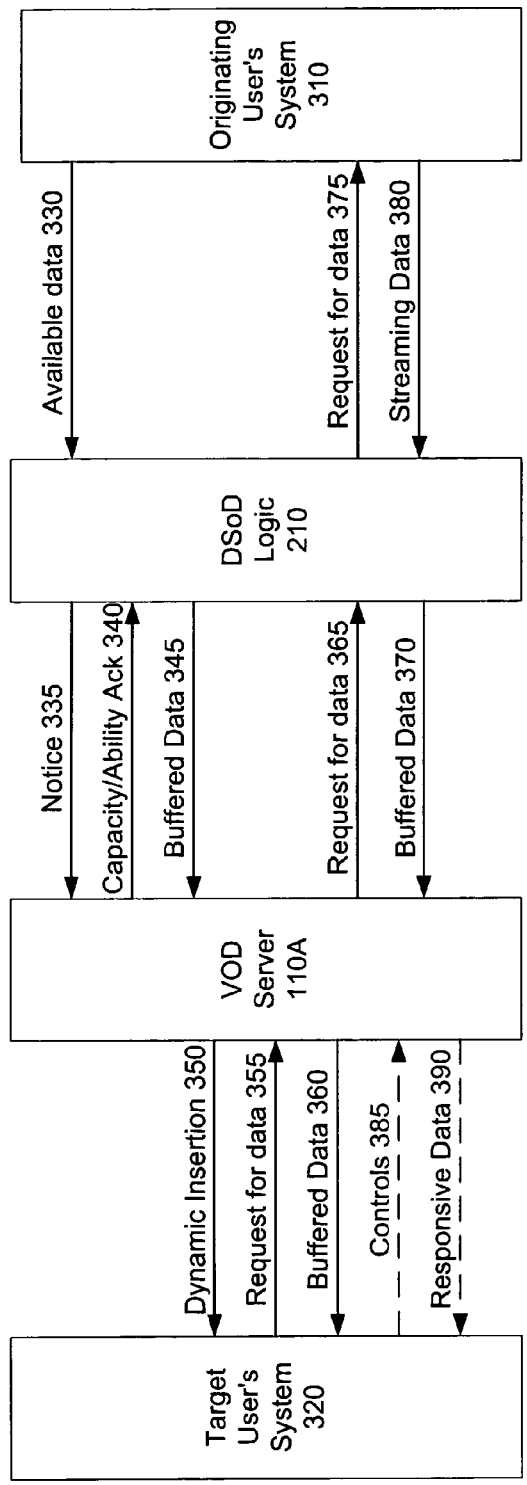
FIG. 3 is one embodiment of a data flow diagram illustrating the dataflow for insertion and display of the personal data.

FIG. 3 is one embodiment of a data flow diagram illustrating the dataflow for insertion and display of the personal data. This process illustrates one example of how a target user's system obtains the data from an originating user. In one embodiment, the originating user uploads data through the Internet, a wireless network, or any other system. In one embodiment, the data is uploaded through the originating user's system 310. In another embodiment, the data may be uploaded directly from the originating user's recorder (such as a cellular telephone, video camera, web camera, or other recording device) to the cable provider. In one embodiment, the originating user must be a subscriber to the cable service. In another embodiment, the originating user need not be a subscriber, only the target user must be a subscriber. In one embodiment, uploading data is free. The cable provider may charge for one or more of the following: uploading data, making data available to other users, viewing the data, or a subscription fee for having the ability to upload/make available/view data.

The uploaded data is made available to the dynamic stream on demand (DSoD) logic 210. In one embodiment, when a user uploads data, the available data 330 is transmitted to the DSoD 210. In one embodiment, the DSoD 210 is a separate server, which may be accessed through the Internet. In another embodiment, the DSoD 210 is part of the video-on-demand system, and is accessed through the user's cable modem, or cable box.

The DSoD 210 sends a notice 335 to the VOD server, indicating that personal data is available. In one embodiment, the notice includes one or more of the following: originating user, destination(s), and message size. The VOD server 110A indicates that the local VOD server has space on it. The local VOD server, in one embodiment, is identified using the destination address(es) provided by the originator. In one embodiment, the destination address is indicated using a combination of personal name and phone number which can cross-referenced within a subscriber provisioning system to a VOD cable box unique identifier. In one embodiment, each VOD cable box has a unique identifier. In one embodiment, the mapping from the unique identifier to the owner's name, address, and telephone number is maintained by a central VOD server. Thus, when data is uploaded, the central VOD server determines the unique identifier of the VOD cable box of the destination(s) based on the data provided by the originating user. In another embodiment, the destination user is the originating user, for example, to allow viewing of personal data on cable television.

The VOD server 110A then determines whether the local server closest to the destination cable box has the capacity to handle the personal data. In one embodiment, since cable is used, only a limited amount of data can be made available, and that limited bandwidth is shared by all users on the same local server. In one embodiment, the VOD server 110A further determines whether the destination user's cable box is cable of handing these features. If there is capacity/ability to handle the data, the VOD server 110A responds with an ACK 340, and the data is streamed 345 to the VOD server 110A. In one embodiment, the VOD server 110A directly forwards it to a local server which services the destination user's cable box.

Figure 7B:
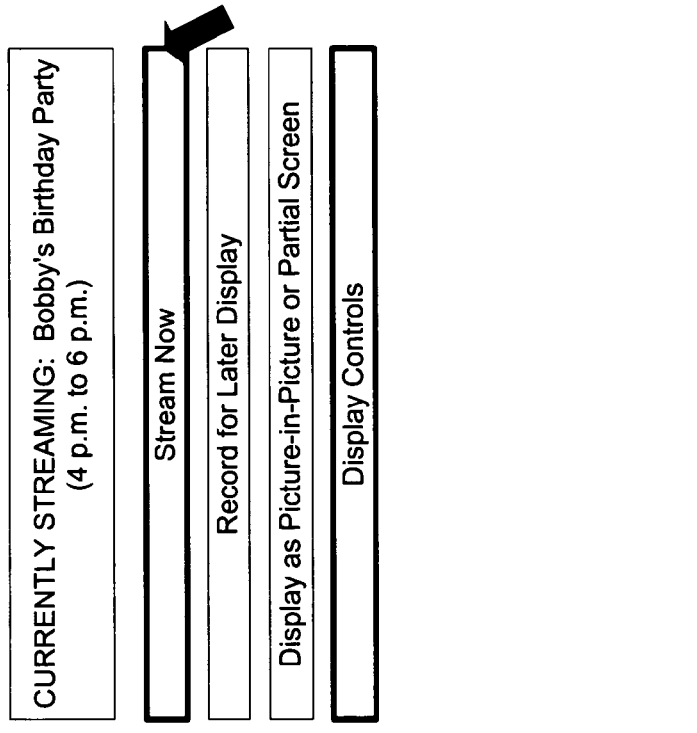
FIGS. 7A-C illustrate exemplary user interfaces.
Figure 7A:
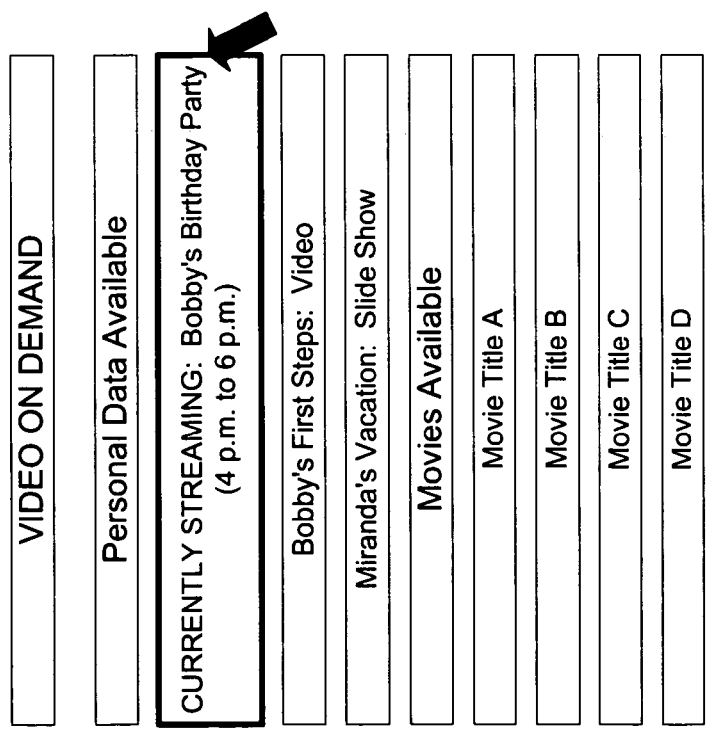
Figure 7C:
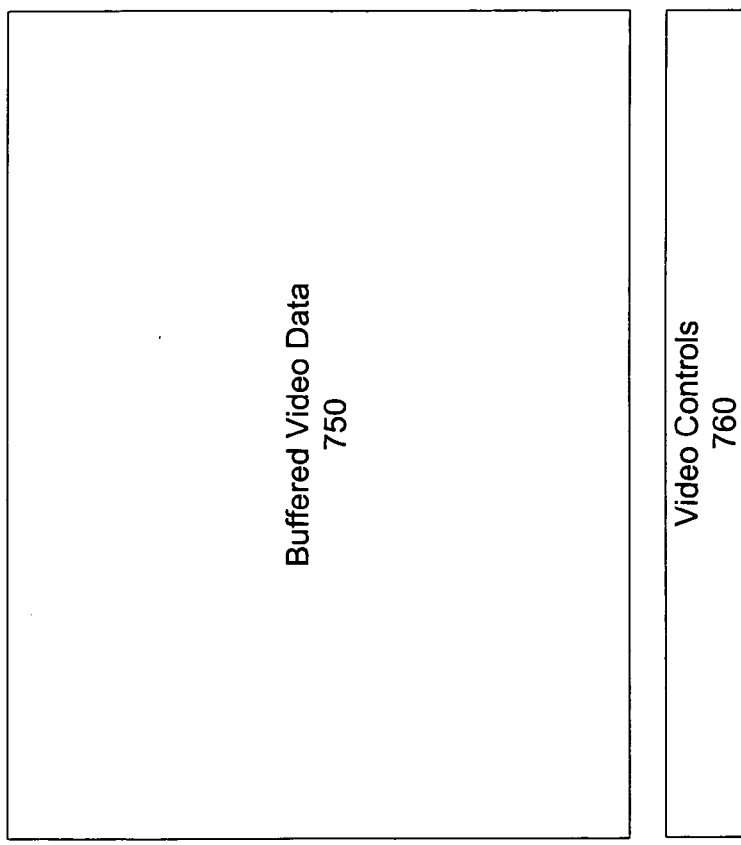

The VOD server 110A in turn adds the availability of personal data notice 350 to the user's cable box display. In general, most cable systems provide a listing of available movies, programs, pay-per-view features, and other features. FIG. 7A shows an exemplary cable display. As can be seen, the personal data available is one of the categories show. Of course, alternative formats of displaying such information may be used. For example, if the user is watching television when personal data becomes available, an icon may flash with this information on the user's television screen or on the cable box itself.

If the user selects the available data, the user's cable box returns a data request 355 to the local VOD server. The VOD server then serves the data 360 to the user. In one embodiment, if the data is not fully downloaded or is streaming data (such as concurrently recorded video), the VOD server 110A passes requests to the DSoD logic 210. In one embodiment, for streaming data a direct connection may be established between the originating user's system 310 and the VOD server which is serving the local cable box of the designated recipient.

In one embodiment, the system further includes controls 385. In one embodiment, these controls may include: fast forward, reverse, stop, play, record, and/or other controls. These controls are responded to, in one embodiment, by the VOD server. In another embodiment, any controls that can be locally services by the user's cable box are serviced locally and not forwarded to the VOD server.

In another embodiment, data is centrally stored until a user specifically requests it, at which point it is forwarded to the local server. In that instance, in one embodiment, the information regarding what personal data is available is pulled by the local server, rather than pushed by the DSoD. This embodiment is described below with respect to FIGS. 8 and 9.

In this way, the originating user can upload data which is displayed on the target user's system upon request. This data may be static data, such as images, audio, or video, or streaming data shown with only a short delay from real-time.

FIG. 8 is a flowchart of one embodiment of generating the dynamic channel guide including the user's data. The process starts at block 810. In one embodiment, the process starts when a user turns on his or her television, indicating to the associated cable box that a channel guide will need to be displayed. In another embodiment, the process repeats periodically as long as the cable box is powered on. In one embodiment, the period is defined by an expiration timer. In another embodiment, expiration time is specified within the channel guide data.

At block 815, a request for the channel guide is received from the cable box. In one embodiment, the cable box is unaware that the channel guide is not a static document, and simply requests the static document identified as channel guide.

At block 820, the static channel guide data is retrieved. In one embodiment, the original request is simply served to the cable box.

In one embodiment, simultaneously with block 820, dynamic data insertion is triggered. Dynamic data insertion performs a look-up service, and attempts to determine if the user has personal data available. Note that while the term "personal data" is used in this description, this data may be uploaded by anyone, and made available to the user/subscriber.

At block 830, the cable box ID of the user is identified. If a separate identifier is used for the personal data subscription, the system looks up the associated personal data subscriber ID. In one embodiment, the two systems may share an ID. Alternatively, separate IDs may be used.

At block 835, the process determines if there is personal data associated with the personal data subscriber ID. In one embodiment, this is a database look-up that is performed at a central "personal data server." In another embodiment, this process may be performed locally, on a local copy of the personal data server/database.

If there is personal data, the process at block 845 inserts reference to the personal data into the channel guide at the indicated location. In one embodiment, the static channel guide page includes a tag indicating where to insert the personal data information. The tag, in one embodiment, does not affect the display at all, if no personal data is inserted. In one embodiment, the content format of the entry in the channel guide representing the personal data may be set by the originator who uploaded the personal data. The process then continues to block 850. If no personal data was found, the process continues directly to block 850, where the channel guide is sent back to the user's cable box. Note that the above process is transparent to the user. In one embodiment, if the look-up process is longer than the warm-up period of the user's system, the static data on the channel guide is displayed immediately and the personal data links are added as they are retrieved. Furthermore, while this is described in a flowchart format, these processes may take place in parallel.

FIG. 9 is a flowchart of one embodiment of serving personal content to a user. The process starts at block 910, when the user, in one embodiment using the remote control, selects one of the personal data sets on the channel guide.

At block 915, a request for personal data is received. In one embodiment, each of the entries on the channel guide is a data pointer. In one embodiment, each of the entries is a universal resource locator (URL). In another embodiment, the entries are unique identifiers, used within the system.

At block 920, the process determines whether the requested data is already in the cache. As discussed above, when the data is translated into a form that can be streamed to the user's cable box, it is temporarily stored in a cache. In one embodiment, once translated, the data may be stored permanently. In one embodiment, this step tests both a local cache, on the local server servicing the requesting cable box, and the central cache associated with the personal data storage.

If the data is available in the cache, whether locally or elsewhere, the process continues to block 925. At block 925, the data is retrieved from the cache, and since it was previously fully processed, it is simply streamed to the cable box. The cable box handles this as any other data stream (i.e. movie). The process then ends, at block 955.

If the data is not in the cache, the process continues to block 930.

At block 930, the data from the personal data storage is accessed. The data may be a video, audio, still images, or a combination of these elements. In one embodiment, when the data is uploaded, it is uploaded as a "data set." For example, a data set may include a number of still images and an accompanying audio track. The data set may include a pre-created slideshow, created by the originating user. The indicated data set is retrieved.

At block 935, a file that can be streamed to the user's system is constructed. In one embodiment, the format of the file is MPEG-2. However, alternative formats may be used. In one embodiment, any encoding needed for high definition or standard television display is included in this processing.

In one embodiment, if the data in the personal data storage includes stand-alone elements such as a collection of videos or still images, the on-the-fly construction includes creating a single file, such as a slide-show including all of the images. In one embodiment, the originating user may specify an order for the files/images, as well as the transitions between elements. In one embodiment, if no order is specified, the files may be randomly ordered. In one embodiment, fade-outs, wipes, or other mechanisms are automatically interspersed with still images, to create an interesting slide show. In one embodiment, cropping and scaling are used to fit the aspect ratio of the original data to the output aspect ratio of the target cable television with minimal distortion. The output of the on-the-fly construction is ready to be viewed.

At block 940, the data is added to the cache, buffered, and sent to the user. In one embodiment, the cache is central and serves all users. In another embodiment, the cache is on the local server.

At block 945, the process determines whether the processed data should expire from the cache. In one embodiment, this is not tested by rather an expiry date & time is included with the data in the cache. In one embodiment, the data expiry is date based. In another embodiment, the data expiry may be use based, that is if the data has not been viewed in a preset period of time, it is expired from the cache. In another embodiment, the data may be stored without expiry. If the data has not expired, the process ends at block 955. If the data has expired, it is deleted, at block 950. The process then ends at block 955.

Figure 4A:
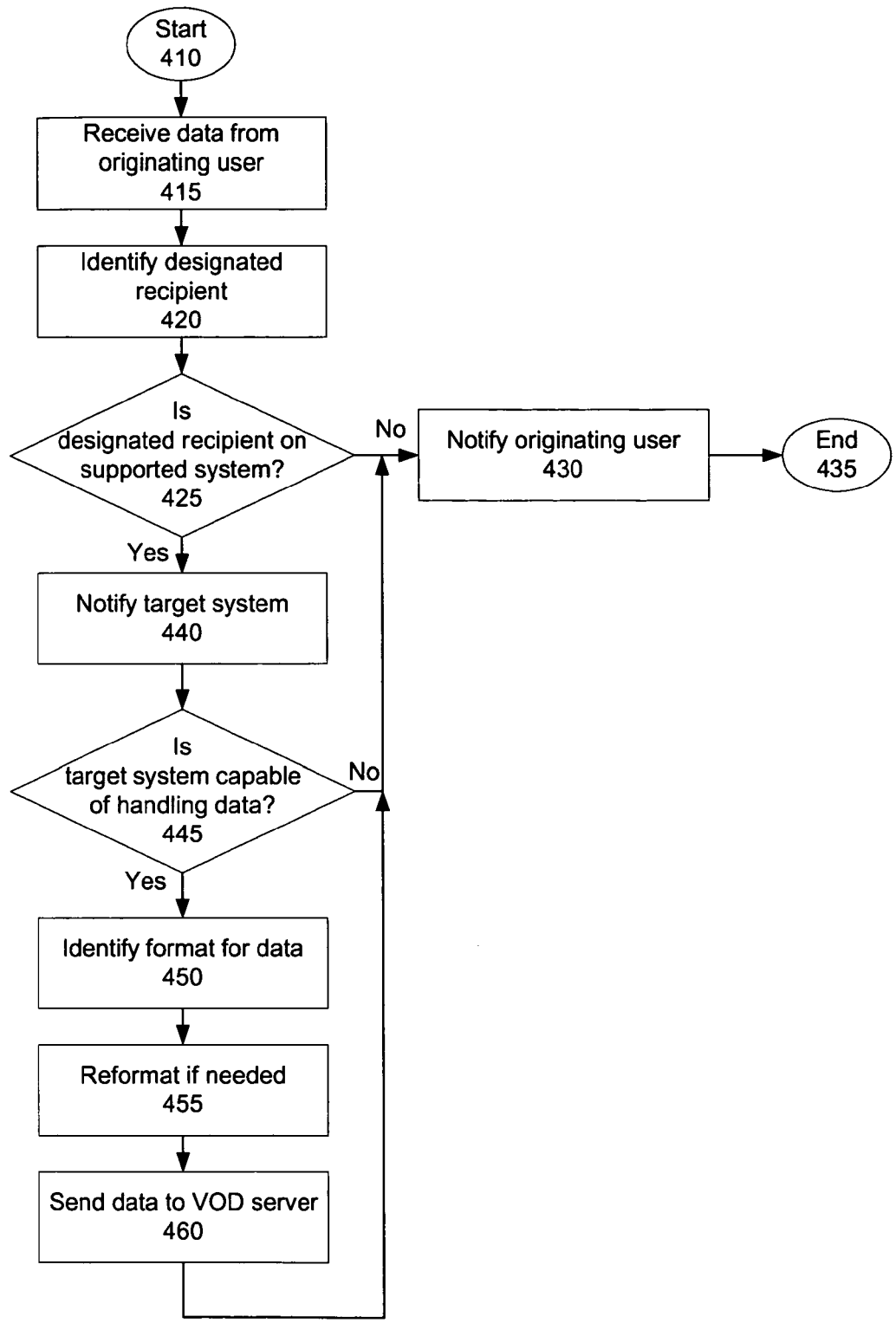
FIGS. 4A and 4B illustrate a flowchart of one embodiment of adding static data, from the perspective of the DSoD logic and VOD Server respectively.
Figure 4B:
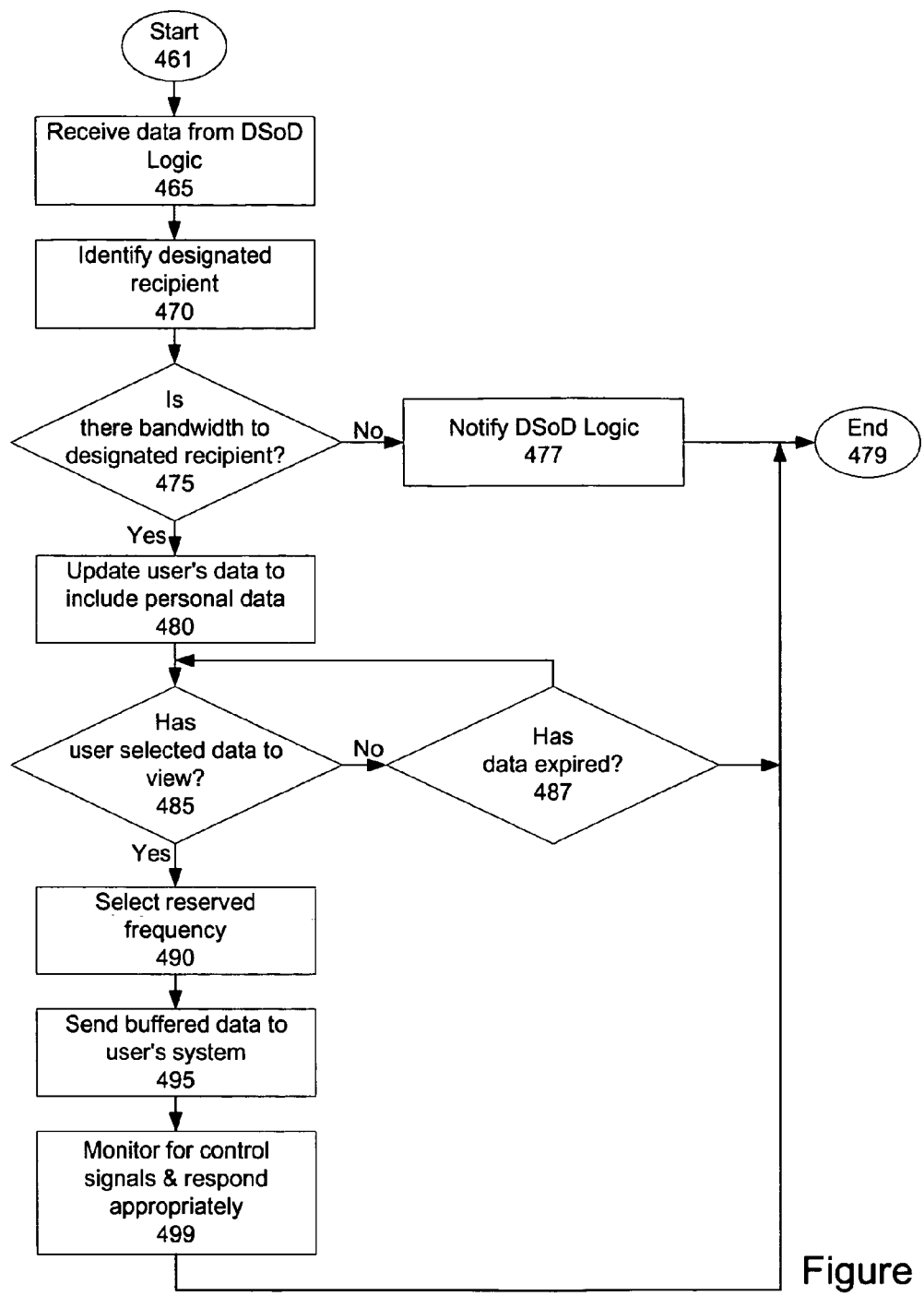

FIGS. 4A and 4B illustrate a flowchart of one embodiment of adding static data, from the perspective of the DSoD and VOD Server respectively. FIG. 4A illustrates the perspective of the DSoD logic.

At block 415, data is received from the originating user. In one embodiment, the data is received via the Internet. In another embodiment, the data is received from the user's camera phone using an MMSC. In one embodiment, the DSoD logic is treated as a Value Added Service (VAS) by the MMSC, and data is transmitted using the MM7 protocols.

At block 420, the designated recipient is identified. In one embodiment, the designated recipient is identified by name, telephone number, cable box code, or in some other way. In one embodiment, the designated recipient must be uniquely identified. In one embodiment, the originating user may identify any number of recipients. In another embodiment, only a limited number of recipients may be designated. In one embodiment, for streaming data only a few recipients may be identified, since it takes significant bandwidth to transmit continuous streamed data.

At block 425, the process determines whether the designated recipient's cable box is capable of handling personal data. In one embodiment, certain subscribers may have old-fashioned cable boxes that cannot handle video-on-demand, and therefore cannot handle personal information being sent to the recipient. In an alternative embodiment, the process simply stores the data at this point, and the below sequence only occurs once a designated recipient has requested the data.

If the recipient's system cannot handle the data, at block 430 the originating user is informed, and the transaction is aborted. In one embodiment, a separate thread tests each designated recipient's readiness to receive this data. In one embodiment, a unique cable box identifier is assigned to each cable box, and this unique identifier indicates whether personal data can be sent to the cable box. In one embodiment, the originating user is notified if one or more of the recipients are unable to receive the data. The process then ends at block 435.

If the recipients' system is able to receive the data, the process continues to block 440.

At block 440, the target system is notified. In one embodiment, the "target system" in this example is the local video-on-demand (VOD) server. In one embodiment, the notification comprises a link to the personal data being sent to the local server. In another embodiment, the personal data is sent to the local server. This enables local service of requests, and thus distributes processing. In one embodiment, the notification is the beginning of the data stream into the local server's cache.

In one embodiment, at block 445, the process determines whether the local server has the bandwidth to handle the data and forward it to the user. In one embodiment, a limited bandwidth connection is shared by all users connected to a local server. Therefore, the local server cannot accept more personal data connection than can be handled by the available bandwidth. If the local server cannot handle the data, the originating user is notified at block 430, and the process ends. Otherwise, the process continues to block 450.

At block 450, the format of the data being transferred is identified. Data may be sent in various forms. For example, for photographic images the data formats include RAW, JPEG, GIF, and other formats. Similarly, video and audio can be encoded in various ways.

At block 455, the process reformats the data if needed. In one embodiment, single images are reformatted into a slide show, to enable the system to stream them as a grouping of images, instead of individual images. In another embodiment, single images are sent individually. In one embodiment, all of the data in the personal data file being transmitted is formatted into a single file, so that the VOD system can send the file using a single connection.

At block 460, the data is sent to the local VOD server. Note that the above described elements may take place on a combination of the originating user's system, the DSoD system, and the central VOD server.

FIG. 4B is a flowchart of one embodiment of the process used by the local VOD server to serve the data to the user's system. The process starts at block 465, when data is received from the DSoD logic (or the central VOD server). At block 470, the designated recipient is identified, and the process ensures that there is sufficient bandwidth available between the VOD server and the user's cable box to send the personal data. If there is not, the DSoD logic is notified at block 477, and the process ends at block 479.

At block 480, the user's data is updated to include personal data. In one embodiment, cable display data is updated periodically. On the next update, the personal data is added to the listing. An example of how this may be shown is illustrated in FIG. 7A. In another embodiment, whenever new data is received the cable box is immediately updated. In another embodiment, when the user turns on the "display available shows" feature, the system automatically updates the available show listings, and the personal data would be included in that update. In one embodiment, the display of the personal data is separate from the display of the video-on-demand data and programming data. In one embodiment, each is separately selectable by the user. In one embodiment, the "personal data" selection is only available if the user has some personal data that could be viewed.

At block 485, the process determines whether the user has selected to view the personal data that is available. If not, the process continues to block 487. At block 487 the process determines whether the data has expired. In one embodiment, personal data is maintained only for a limited time. In one embodiment, however, the user may choose to save the personal data for a longer period, or potentially permanently. If the data has expired, the process ends at block 479. In one embodiment, if some data still remains, the process returns to block 485. In one embodiment, this is an interrupt driven process, so the user selection triggers block 490. In one embodiment, the process tests whether the data has expired periodically. For example, in one embodiment whenever the user is logging into the system (i.e. has turned on the cable box and the display) the system determines whether there are any available personal data elements, and then prior to displaying them tests whether they have expired.

If the user selected data to view, at block 485, the process continues to block 490.

At block 490, the system selects a dedicated frequency to be used for transmitting the personal data. In another embodiment, multiple users viewing the same personal data (for example streaming data) at the same time may share a frequency.

At block 495, buffered data is sent to the user's system. The data is buffered because that ensures that random variations in bandwidth do not affect the user's viewing experience. In one embodiment, the data is not buffered. In one embodiment, the user's system also performs buffering.

Figure 5:
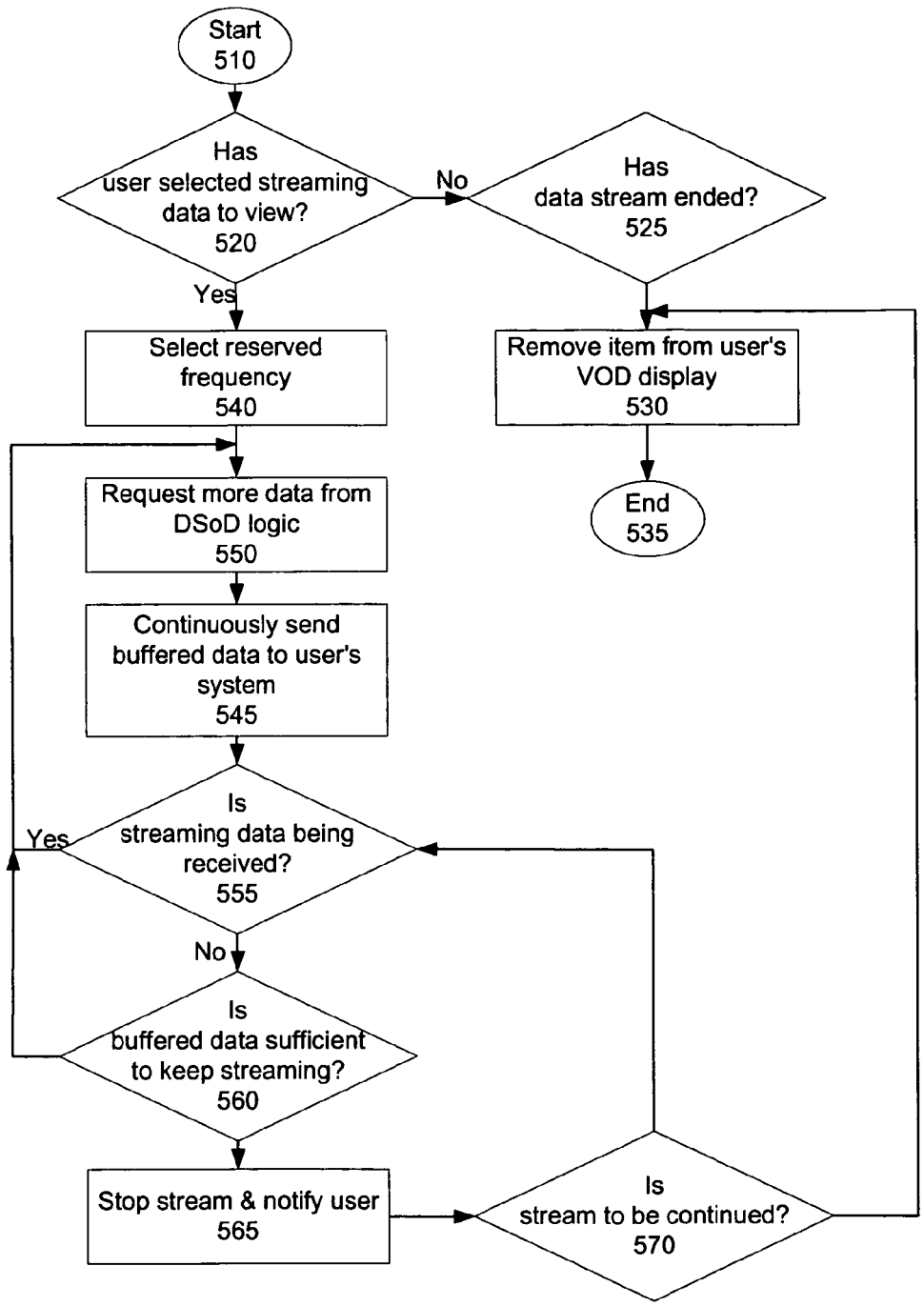
FIG. 5 is a flowchart of one embodiment of adding dynamic/currently changing data.

At block 499, the process monitors for control signals, and responds appropriately if and when control signals are received. The control signals may include one or more of the following: play, stop, fast forward, rewind, skip, save. Other commands may be available. In one embodiment, the local cable box handles the commands if the data is locally available. If not, the cable box communicates with the local VOD, as described above, to fulfill the requests. In one embodiment, for streaming (i.e. effectively real-time) data most of the commands are not available, since there is no data to be forwarded or skipped. FIG. 5 is a flowchart providing more detail on displaying streaming data.

FIG. 5 is a flowchart of one embodiment of adding dynamic/currently changing data. The process starts at block 510. At block 520, the process determines that the user has selected streaming data to view. At block 525, the process determines whether the data stream has ended. In one embodiment, the data stream is only available concurrently while it is being sent. In another embodiment, after the data stream has been completed, it is available as a non-real time personal data presentation. In one embodiment, the user can choose to save such streaming data.

If the data stream has ended (i.e. is not real-time) in one embodiment, at block 530 it is removed from the user's VOD display. In another embodiment, it is moved from the real-time listings to the "stored personal data" listings. The process then ends at block 535.

If the user has selected streaming data, and the streaming data is still real-time, the process continues to block 540. At block 540, a reserved frequency is selected. As noted above, in one embodiment multiple users coupled to the same VOD server listening to the same streaming content may be able to share frequencies. Note furthermore that while the term "frequency" is used, it should be understood that the transmission may be made in an environment using frequency splitting, wireless, optical transmission, or other formats. Therefore, this step simply ensures that the data can be transmitted without interference in whatever transmission format is used.

At block 545, a data request is made to the DSoD to set up the streaming data. In one embodiment, a connection is established between the original user and the receiving user's cable box, through the DSoD and the VOD server. In another embodiment, the VOD server and/or the DSoD logic may step out of the transmission line, and create a direct connection, to reduce lag.

At block 550, the system starts sending buffered data to the user's display through the user's cable box.

At block 555, the process determines whether streaming data is being received. If so, the process returns to block 550, to send the buffered data to the user's system.

If the streaming data is not being received, at block 560 the process determines whether the buffered data is sufficient to keep streaming the data. If so, it returns to block 545. Otherwise it continues to block 565, to stop streaming and notify the user that the stream stopped.

At block 570, the process determines whether the stream is to be continued. In one embodiment, the stream is assumed to be continuing until an "end of stream" message is sent. In another embodiment, after a preset period of time the stream is assumed to be terminated. If the stream is to be continued, the process continues to block 555, to await further data. If the stream is ended, the process continues to block 530.

In another embodiment, the system simply displays the data in the buffer, and notifies the user if the data is no longer streaming in. In another embodiment, the process simply takes a "freeze frame" if no more data is coming in, until new data arrives.

Figure 6:
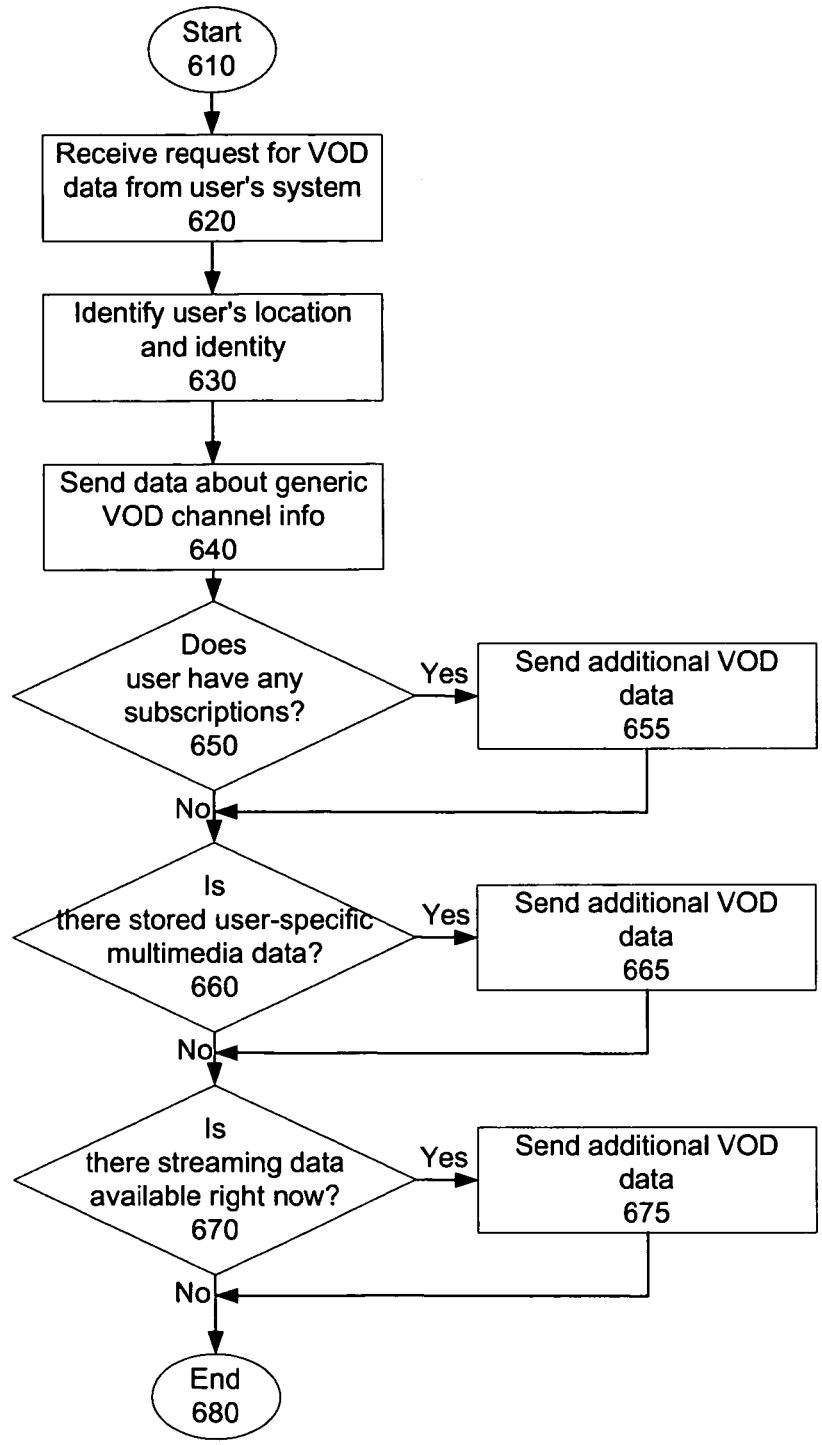
FIG. 6 is a flowchart of one embodiment of retrieving user information for display on the cable menu.

FIG. 6 is a flowchart of one embodiment of retrieving user information for display on the cable menu. The process starts at block 610. At block 620, the user's request for VOD data is received. In one embodiment, the user selects the "personal data" from the display, as is shown in FIG. 7A.

At block 630, the user's identity is determined, and the location of the relevant VOD local server is identified.

At block 640, the available video-on-demand channels are generated and sent to the user. At block 650, the process determines whether the user has any subscriptions. In one embodiment, the user may subscribe to certain pay-based or subscription based video-on-demand channels. For example, the Food Channel may offer a special cooking show just for people who subscribe to it. In another embodiment, users may belong to a shared community of content contributors and viewers such as "independent film society of Dayton Ohio." If the user has subscriptions, at block 655 the additional VOD data associated with the subscriptions is sent to the user. The process then returns to block 660. If the user does not have a subscription, the process continues directly to block 660.

At block 660, the process determines whether there is stored personal data associated with the user. If there is, the process at block 665 sends the information about the stored personal data to the display.

At block 670, the process determines whether there is currently streaming data available. If so, the process at block 675 sends information about the streaming data. In one embodiment, the process continuously monitors the availability of current real-time streaming data availability. In one embodiment a visual and/or audio alert is sent immediately when real-time data is available. Since the real-time data is extremely time sensitive, the user is immediately alerted to its existence, in one embodiment.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer-implemented method for displaying personal data comprising:
   receiving a notice from a dynamic streaming server that indicates personal data is available for a subscribing user of a cable service provider, the personal data uploaded by an originating user to the dynamic streaming server;
   in response to notifying the dynamic streaming server that space is available for storage of at least part of the personal data, receiving the at least part of the personal data from the dynamic streaming server;
   dynamically constructing a single video file of display data by combining a set of multiple image files of disparate file types not suitable for serving to the cable box of the subscribing user into the single video file, the single video file formatted for streaming to the destination cable box and designed to be displayed on the recipient's television;
   in response to a video on demand (VOD) channel guide request from the subscribing user, a VOD server determining whether there is personal data available for the subscribing user, inserting a link for the personal data into a particular VOD channel guide created for the subscribing user, and providing an availability of the personal data to the cable box of the subscribing user in the particular VOD channel guide provided by the VOD server to the subscribing user, wherein the particular VOD channel guide created for the subscribing user is different from VOD channel guides provided to other subscribing users not associated with the personal data; and
   in response to receipt of a request from the cable box of the subscribing user for the personal data, serving the personal data.

2. The computer-implemented method of claim 1, further comprising:
   forwarding the request for the personal data to the dynamic streaming server when the personal data is not fully stored;
   receiving a stream of media data from the dynamic streaming server, corresponding to the requested personal data; and
   forwarding the stream of media data to the cable box of the subscribing user.

3. The method of claim 1, further comprising:
   identifying a destination cable box from among a plurality of destination cable boxes based on identification information provided by the originating user;
   creating a mapping of the personal data to a unique ID associated with the destination cable box in a personal data server; and
   in response to receiving the VOD channel guide request from the destination cable box, performing an ID look-up to identify the unique ID for the destination cable box making the VOD channel guide request, and using the look-up to provide the availability of the personal data to the cable box of the subscribing user without providing the availability of the personal data to other subscribing users.

4. The method of claim 1, further comprising:
   inserting a link to the personal data into the particular VOD channel guide created for, and provided to, the cable box of the subscribing user, wherein the particular VOD channel guide with the link is not provided to cable boxes that are not identified by the originating user.

5. The method of claim 1, wherein the personal data comprises one or more of the following: static images, videos, slide-shows, streaming data, recordings, streaming audio data, and live video.

6. A system to permit display of personal data using a cable box comprising, a server comprising:
   receiving logic to receive personal data from an originating user, targeted to one or more destinations;
   a target ID logic to identify a destination cable box from among a plurality of destination cable boxes based on identification information provided by the originating user and create a mapping of the personal data to a unique ID associated with the destination cable box in a personal data server;
   an insertion tool to receive an indication from the personal data server that the unique ID for the destination cable box is associated with personal data and insert a link to the personal data into a particular VOD channel guide created for, and provided to, the identified destination cable box, wherein the particular VOD channel guide with the link is different from VOD channel guides provided to cable boxes that are not identified by the originating user; and
   in response to a user request for personal data, a data constructor to dynamically construct a single file of display data, from a set of multiple personal data files of disparate types combined into the single file of display data, formatted for the destination cable box and designed to be displayed on the recipient's television.

7. The system of claim 6, further comprising:
   the target ID box to perform an ID look-up to identify the unique ID for the destination cable box making the VOD channel guide request, and
   the personal data server to receive an indication of the unique ID from the VOD server, determine that the identified unique ID is associated with the personal data based on the mapping in response to receipt of the indication of the unique ID from the VOD server and without receipt of a request for the personal data by the destination cable box, and provide an indication to the VOD server that the personal data is associated with the unique ID.

8. The system of claim 6, further comprising:
   an interface to forward personal data from the originating user to a video-on-demand (VOD) server, the personal data being media data made by the originating user.

9. The system of claim 6, further comprising controls to enable a user to view the personal data using the cable box and VOD interface.

10. The system of claim 6, wherein the personal data comprises one or more of the following: static images, videos, slide-shows, streaming data, recordings, streaming audio data, and live video.

11. The system of claim 6, further comprising:
   the insertion tool comprising a dynamic personal info inserter to determine if there is personal data available for a user, and to insert links for the personal data in pre-tagged locations in the particular VOD channel guide.

12. The system of claim 6, further comprising:
   a dynamic streaming server to stream media data from the originating user to the cable box of the subscribing user when the personal data is not fully stored.

13. A computer implemented method for a dynamic streaming server to provide personal data to a video on demand server, comprising:
   transmitting notice to the video on demand server that indicates personal data is available for a subscribing user of a cable service provider, the personal data uploaded to the video on demand server by an originating user and addressed to one or more users associated with the cable service provider, wherein the personal data includes a set of multiple files of disparate image file types not suitable for serving to a cable box of the subscribing user;
   dynamically constructing a single video file of display data by combining the set of multiple files of disparate file types into the single video file, the single video file formatted for streaming to the cable box of the subscribing user;
   transmitting the personal data in the single video file to the video on demand server for streaming to a cable box associated with the subscribing user; and
   in response to a video on demand (VOD) channel guide request from the subscribing user, the video on demand server inserting a link for the personal data into a particular VOD channel guide created for the subscribing user, and providing an availability of the personal data to the cable box of the subscribing user in the particular VOD channel guide, wherein the particular VOD channel guide created for the subscribing user is different from VOD channel guides provided to other subscribing users not associated with the personal data.

\* \* \* \* \*